US012658370B2

(12) United States Patent
Yeon et al.

(10) Patent No.: US 12,658,370 B2
(45) Date of Patent: Jun. 16, 2026

(54) MULTILAYER ELECTRONIC COMPONENT

(71) Applicant: SAMSUNG ELECTRO-MECHANICS CO., LTD., Suwon-si (KR)

(72) Inventors: Gyu Ho Yeon, Suwon-si (KR); Sung Chul Kim, Suwon-si (KR); Geon Park, Suwon-si (KR); Chi Min Oh, Suwon-si (KR); Myung Won Hwang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 188 days.

(21) Appl. No.: 18/763,658

(22) Filed: Jul. 3, 2024

(65) Prior Publication Data

US 2025/0118495 A1    Apr. 10, 2025

(30) Foreign Application Priority Data

Oct. 4, 2023    (KR) ........................ 10-2023-0131636

(51) Int. Cl.
H01G 4/30 (2006.01)
H01G 4/12 (2006.01)
H01G 4/232 (2006.01)

(52) U.S. Cl.
CPC ............... H01G 4/232 (2013.01); H01G 4/12 (2013.01); H01G 4/30 (2013.01)

(58) Field of Classification Search
None
See application file for complete search history.

(56) References Cited

U.S. PATENT DOCUMENTS

| | | | | |
|---|---|---|---|---|
| 9,672,984 | B2 * | 6/2017 | Kim ......................... | H01G 4/12 |
| 11,462,360 | B2 * | 10/2022 | Lee ....................... | H01G 4/1227 |
| 11,610,732 | B2 * | 3/2023 | Choi ...................... | H01G 4/232 |
| 2012/0075766 | A1 * | 3/2012 | Nishioka ................ | H01G 4/005 |
| | | | | 361/301.4 |
| 2021/0005390 | A1 * | 1/2021 | Lee ........................... | H01G 4/12 |
| 2022/0238274 | A1 * | 7/2022 | Choi ...................... | H01G 4/012 |
| 2025/0118495 | A1 * | 4/2025 | Yeon ...................... | H01G 4/012 |

FOREIGN PATENT DOCUMENTS

| | | | |
|---|---|---|---|
| JP | 2014-232850 A | 12/2014 | |
| KR | 100593889 B1 * | 6/2006 | ............... H01G 2/14 |
| KR | 10-2022-0106498 A | 7/2022 | |

* cited by examiner

*Primary Examiner* — Dion R. Ferguson

(74) *Attorney, Agent, or Firm* — Morgan, Lewis & Bockius LLP

(57) ABSTRACT

A multilayer electronic component includes a body including a dielectric layer and an internal electrode layer alternately disposed with the dielectric layer in a first direction, wherein the internal electrode layer includes a main portion, a lead portion extending from the main portion to the external electrode and having a size smaller than the main portion, and a reinforcing pattern disposed on both sides of the lead portion, and the reinforcing pattern includes a carbide.

12 Claims, 8 Drawing Sheets

FIRST
DIRECTION

SECOND
DIRECTION

I - I'

FIRST
DIRECTION

THIRD
DIRECTION

II-II'

FIRST
DIRECTION

THIRD
DIRECTION

III-III'

10

10'

MULTILAYER ELECTRONIC COMPONENT

CROSS-REFERENCE TO RELATED APPLICATION(S)

This application claims benefit of priority to Korean Patent Application No. 10-2023-0131636 filed on Oct. 4, 2023 in the Korean Intellectual Properties Office, the disclosure of which is incorporated herein by reference in its entirety.

BACKGROUND

The present disclosure relates to a multilayer electronic component.

A multilayer ceramic capacitor (MLCC), a multilayer electronic component, is a chip-type condenser mounted on the printed circuit boards of various types of electronic products or automobile products, such as an image display device such as a liquid crystal display (LCD) or a plasma display panel (PDP), a computer, a smartphone, a mobile phone, an On Board Charger (OBC) of electric vehicles, a circuit such as a DC-DC converter, infotainment systems, and the like, serving to charge or discharge electricity therein or therefrom.

Currently, a multilayer ceramic capacitor requires new technologies to ensure reliability in high-temperature, high-humidity, and high-voltage environments due to the influence of high capacitance and miniaturization.

As a method to improve moisture resistance reliability, a means of increasing a permeation path of external moisture by forming a bottleneck in some regions in which an internal electrode is connected to an external electrode is used. In this case, a proportion occupied by the internal electrode may be reduced, which may cause a problem in which chip strength decreases.

Therefore, when forming a bottleneck in the internal electrode to improve moisture resistance reliability, it is necessary to develop structural features to improve a side effect of decreasing chip strength.

SUMMARY

An aspect of the present disclosure is to alleviate the problem of a decrease in strength? of a multilayer electronic component that may occur when forming a bottleneck in an internal electrode.

However, the purpose of the present disclosure is not limited to the above-described content, and may be more easily understood in the process of explaining specific embodiments of the present disclosure.

According to an aspect of the present disclosure, provided is a multilayer electronic component, the multilayer electronic component including: a body including a dielectric layer and an internal electrode layer alternately disposed with the dielectric layer in a first direction, the body including a first surface and a second surface opposing each other in the first direction, a third surface and a fourth surface opposing each other in a second direction, perpendicular to the first direction, and a fifth surface and a sixth surface opposing each other in a third direction, perpendicular to the first and second directions; and an external electrode disposed on the third and fourth surfaces, wherein the internal electrode layer includes a main portion, a lead portion extending from the main portion to the third surface or the fourth surface to be connected to the external electrode and having a size in the third direction smaller than the main portion, and a reinforcing pattern disposed on both sides of the lead portion in the third direction, wherein the reinforcing pattern includes a carbide.

BRIEF DESCRIPTION OF DRAWINGS

The above and other aspects, features, and advantages of the present disclosure will be more clearly understood from the following detailed description, taken in combination with the accompanying drawings, in which.

DETAILED DESCRIPTION

Figure 1:
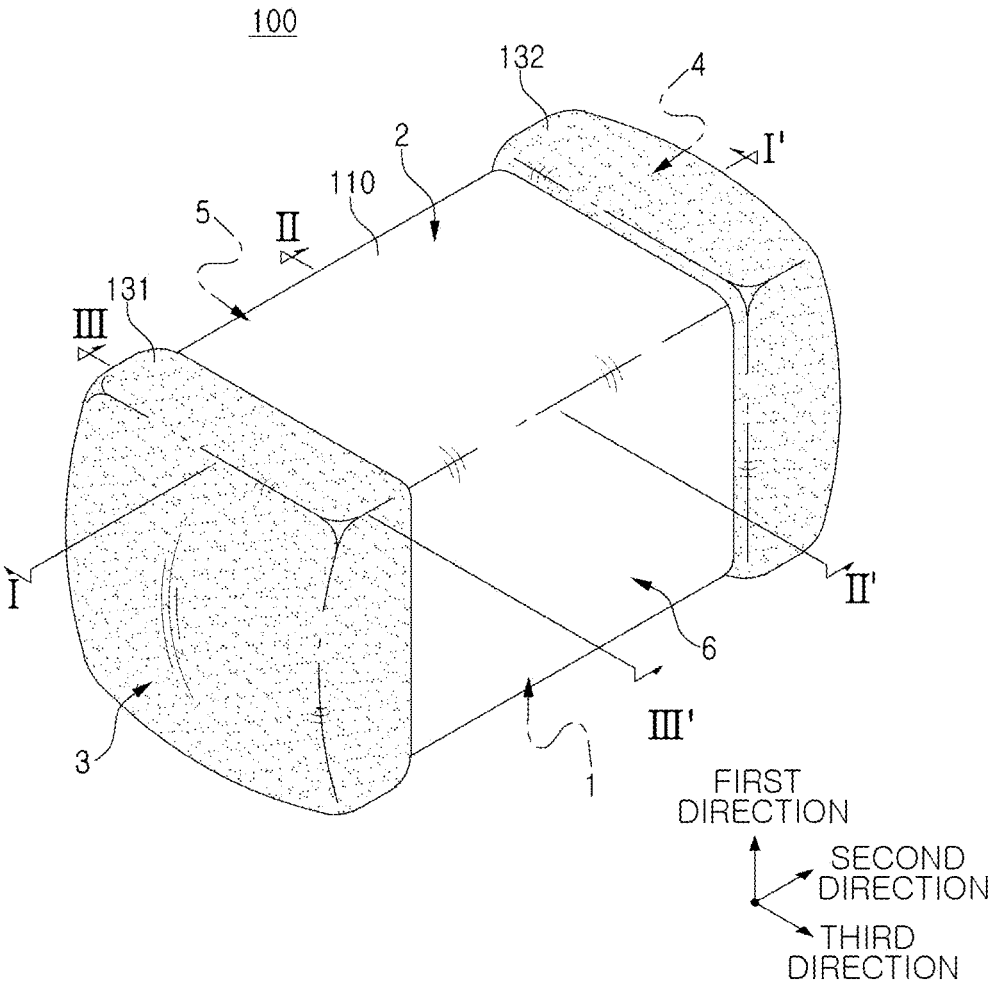
FIG. 1 is a perspective view schematically illustrating a multilayer electronic component according to an embodiment of the present disclosure.

Hereinafter, specific embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are the same elements in the drawings.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may further include other components as well, rather than excluding other components, unless specifically stated otherwise.

In the drawings, a first direction may be defined as a direction in which first and second internal electrodes 121 and 122 are alternately disposed with a dielectric layer interposed therebetween or a thickness (T) direction, and among second and third directions, perpendicular to the first direction, the second direction may be defined as a length (L) direction, and the third direction may be defined as a width (W) direction.

FIG. 1 is a perspective view schematically illustrating a multilayer electronic component according to an embodiment of the present disclosure.

Figure 2:
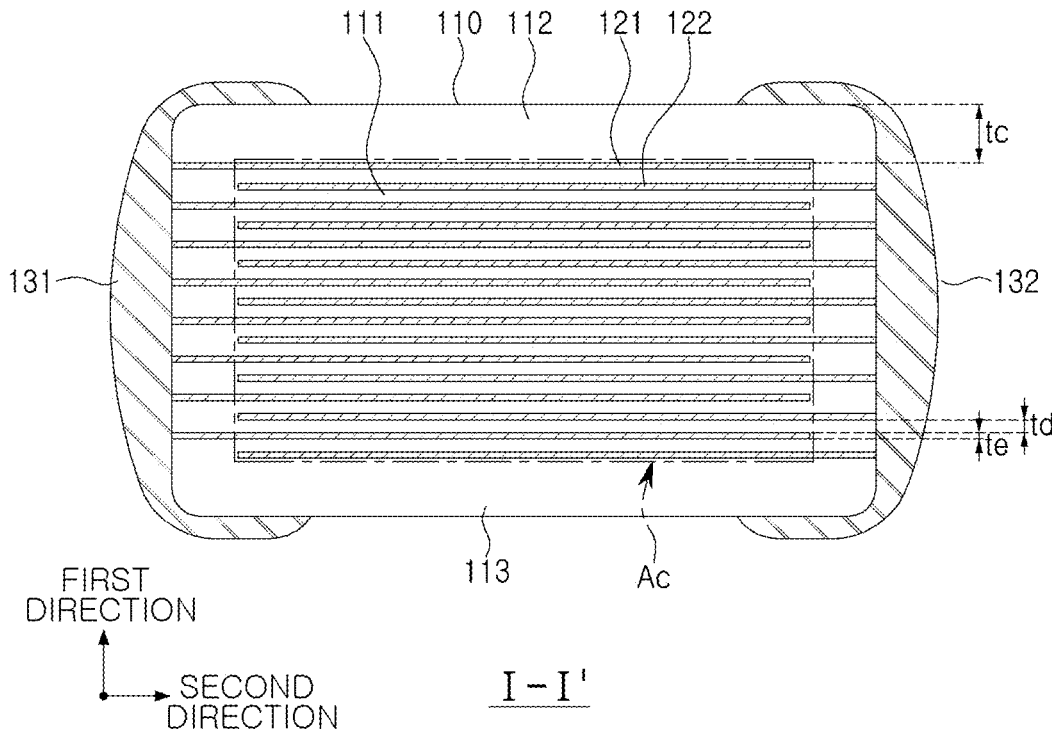
FIG. 2 is a cross-sectional view taken along line I-I' of FIG. 1.

FIG. 2 is a cross-sectional view taken along line I-I' of FIG. 1.

Figure 3:
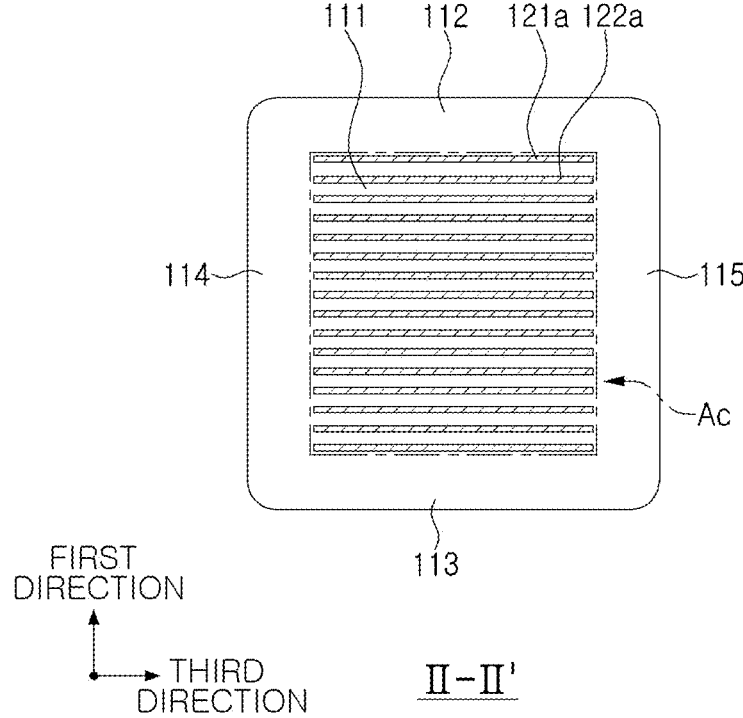
FIG. 3 is a cross-sectional view taken along line II-II' of FIG. 1.

FIG. 3 is a cross-sectional view taken along line II-II' of FIG. 1.

Figure 4:
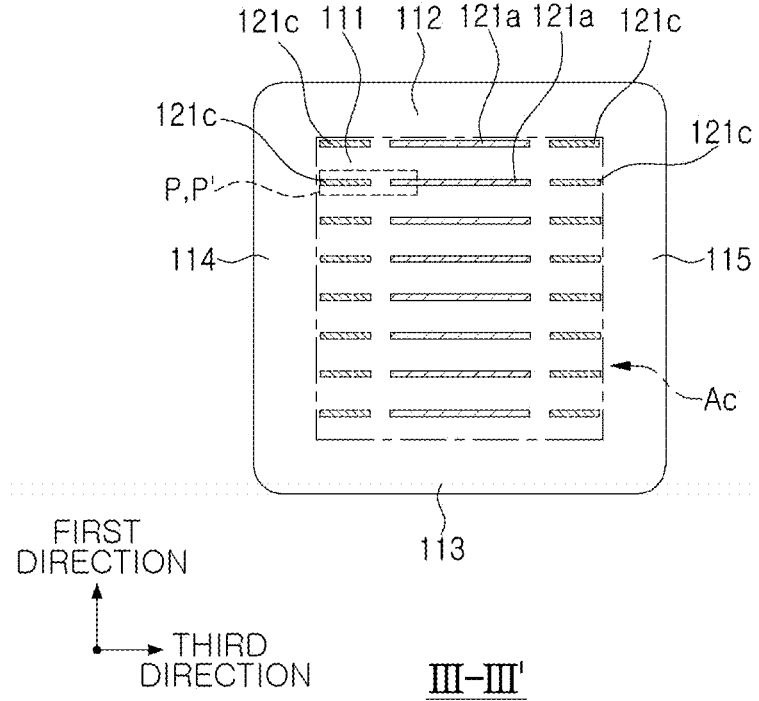
FIG. 4 is a cross-sectional view taken along line III-III' of FIG. 1.

FIG. 4 is a cross-sectional view taken along line III-III' of FIG. 1.

Figure 5:
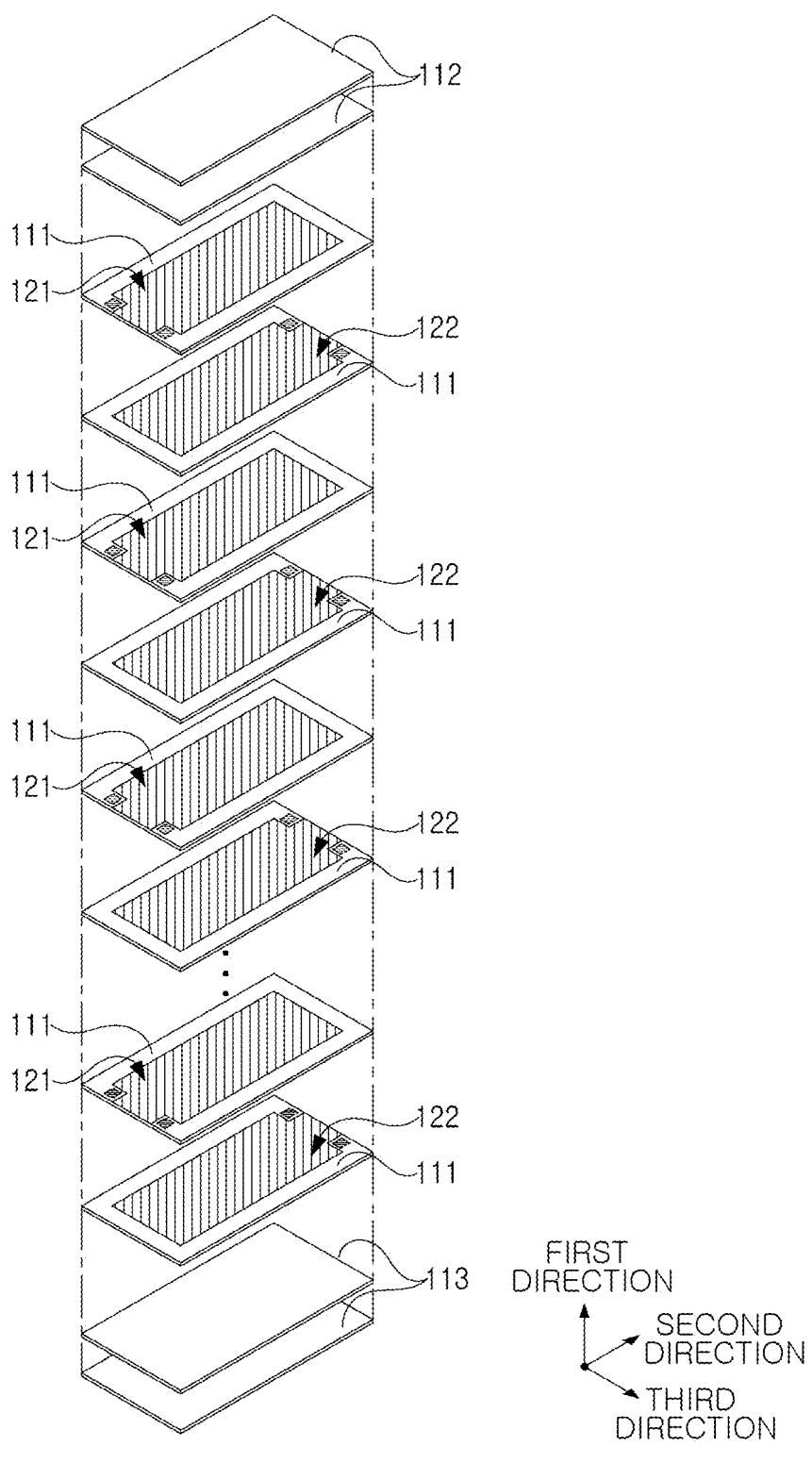
FIG. 5 is an exploded perspective view illustrating a structure of a body according to an embodiment.

FIG. 5 is an exploded perspective view illustrating a structure of a body according to an embodiment.

Figure 6:
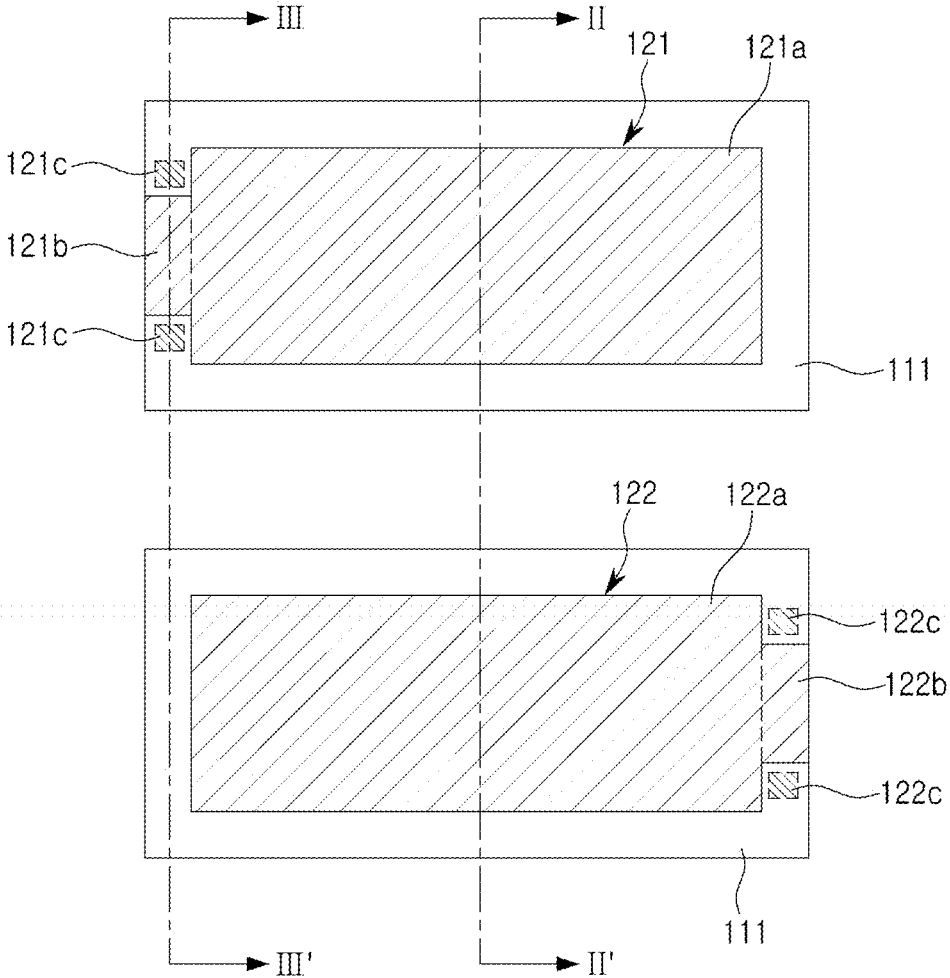
FIG. 6 is a plan view illustrating a structure of an internal electrode layer according to an embodiment.

FIG. 6 is a plan view illustrating a structure of an internal electrode layer according to an embodiment.

Figure 7:
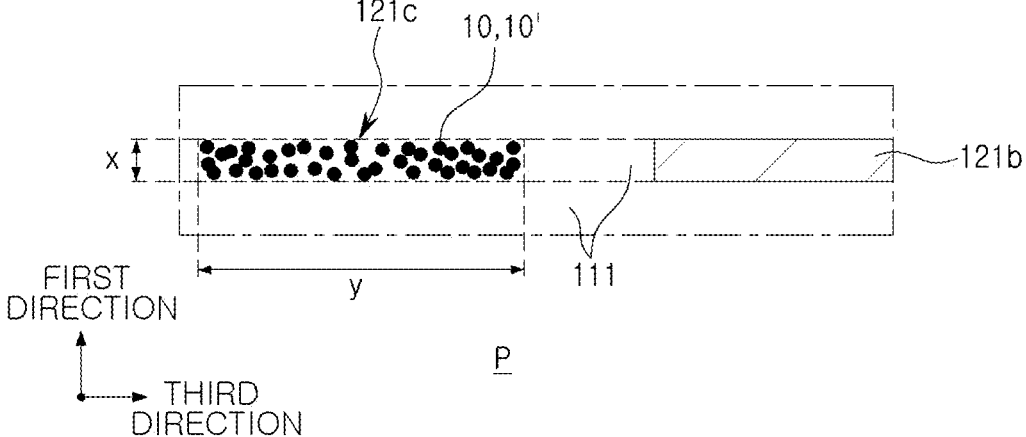
FIG. 7 is an enlarged view of region P and region P' of FIG. 4.
Figure 7:
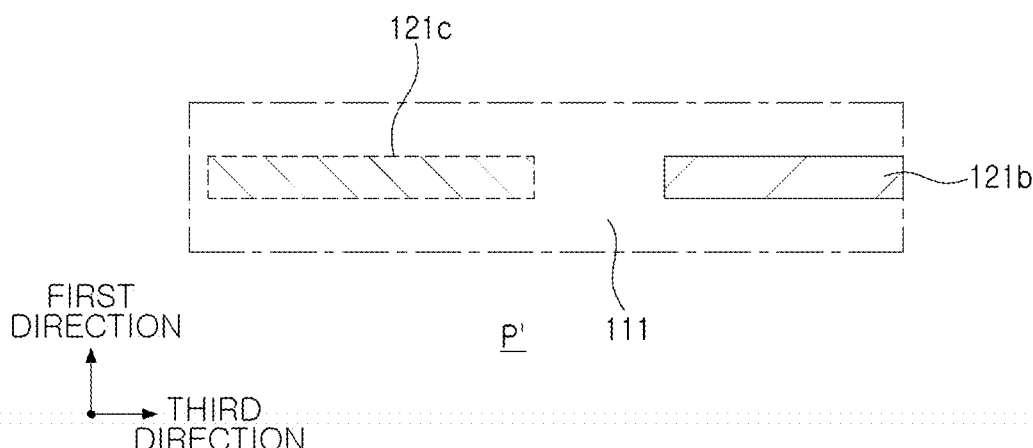

FIG. 7 is an enlarged view of region P and region P' of FIG. 4.

Figure 8:
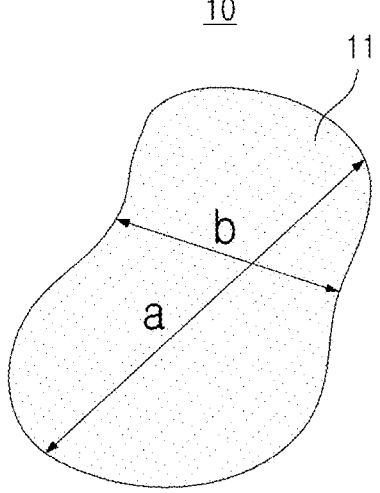
FIG. 8 is a schematic diagram illustrating a shape of particles according to an embodiment.
Figure 8:
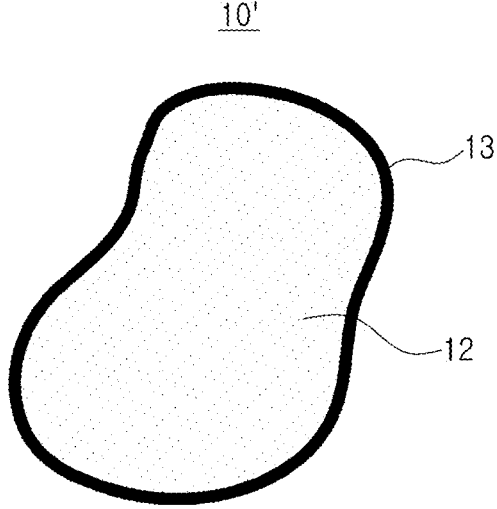

FIG. 8 is a schematic diagram illustrating a shape of particles according to an embodiment.

Hereinafter, a multilayer electronic component and various examples thereof according to some embodiments of the present disclosure will be described in greater detail with reference to FIGS. 1 to 8.

According to some embodiments of the present disclosure, a multilayer electronic component 100 may include a body 110 including a dielectric layer 111 and internal electrode layers 121 and 122 alternately disposed with the dielectric layer 111 in a first direction. The body 110 includes first and second surfaces 1 and 2 opposing each other in the first direction, third and fourth surfaces 3 and 4 opposing each other in a second direction, perpendicular to the first direction, and fifth and sixth surfaces 5 and 6 opposing each other in a third direction, perpendicular to the first and second directions; and external electrodes 131 and 132 disposed on the third and fourth surfaces, respectively. The internal electrode layers include main portions 121a and 122a, lead portions 121b and 122b extending from the main portions 121a and 122a to the third surface or the fourth surface to be connected to the external electrodes, respectively, and having a size in the third direction smaller than a size of the main portions in the third direction, and reinforcing patterns 121c and 122c disposed on both sides of the lead portions 121b and 122b in the third direction, wherein the reinforcing patterns 121c and 122c include a carbide and spaced apart from the lead portions 121c and 122c and the main portions 121a and 122a, respectively.

The body 110 may include a dielectric layer 111 and internal electrode layers 121 and 122 alternately disposed in the first direction with the dielectric layer 111 interposed therebetween.

The shape of the body 110 may not be limited to any particular shape, but as illustrated, the body 110 may have a hexahedral shape or a shape similar to a hexahedral shape. Due to contraction of ceramic powder particles included in the body 110 during a sintering process, the body 110 may not have an exactly hexahedral shape formed by linear lines but may have a substantially hexahedral shape.

The body 110 may include first and second surfaces 1 and 2 opposing each other in a first direction, third and fourth surfaces 3 and 4 opposing each other in a second direction, perpendicular to the first direction, and fifth and sixth surfaces 5 and 6 opposing each other in a third direction, perpendicular to the first and second directions.

A plurality of dielectric layers 111 forming the body 110 may be in a sintered state, and a boundary between the adjacent dielectric layers 111 may be integrated with each other such that the boundary may not be readily apparent without a scanning electron microscope (SEM). There is no need to specifically limit the number of stacked dielectric layers, and may be determined considering the size of the ceramic electronic component. For example, a body may be formed by stacking 300 or more dielectric layers.

A raw material for forming the dielectric layer 111 may vary depending on the purpose thereof. Specifically, ferroelectric $BaTiO_3$ may be used as a material for the main purpose of achieving high capacitance per unit volume, and purpose of achieving high capacitance per unit volume, and paraelectric $CaZrO_3$ may be used as a material for the main purpose of improving reliability in a high temperature environment.

An average thickness "td" of the dielectric layer 111 is not particularly limited.

For the purpose of miniaturization and high capacitance of the multilayer electronic component 100, the average thickness "td" of the dielectric layer 111 may be 0.35 μm or less, and the average thickness "td" of the dielectric layer 111 may be 3 μm or more to improve the reliability of the multilayer electronic component 100 under high temperature and high pressure.

The average thickness "td" of the dielectric layer 111 may refer to an average thickness of the dielectric layer 111 disposed between the first and second internal electrode layers 121 and 122.

The average thickness "td" of the dielectric layer 111 may be measured by scanning an image of cross-sections of the body in the third and first directions (L-T cross-sections) using a scanning electron microscope (SEM).

For example, the average thickness "td" of the dielectric layer 111 may be obtained as follows. In an image of a cross-section of the body 110 in length and thickness directions (L-T) taken at the center of the body 110 in the width direction scanned with a scanning electron microscope, a total of five dielectric layers including two upper layers and two lower layers, based on one dielectric layer at a point at which a centerline of the body in the length direction and a centerline of the body in the thickness direction meet are extracted among the dielectric layers, five points including two left points and two right points based on the one reference point are then determined at equal intervals based on the point at which the centerline of the body in the length direction and the centerline of the body in the thickness direction meet, and thereafter, thicknesses at the respective points may be measured and an average value thereof may be obtained.

As shown in FIG. 2, the internal electrode layers 121 and 122 are alternately disposed with the dielectric layer 111 in the first direction.

The internal electrode layers 121 and 122 may be divided into a first internal electrode layer 121 and a second internal electrode layer 122. The first and second internal electrode layers 121 and 122 may be alternately disposed to face each other with the dielectric layer 111 constituting the body 110 interposed therebetween, and may be in contact with the third and fourth surfaces 3 and 4 of the body 110, respectively, to be connected to external electrodes 131 and 132, to be described later.

Referring to FIG. 2, the first internal electrode layer 121 may be spaced apart from the fourth surface 4 and exposed through the third surface 3, and the second internal electrode layer 122 may be spaced apart from the third surface 3 and exposed through the fourth surface 4.

In this case, the first and second internal electrode layers 121 and 122 may be electrically separated from each other by the dielectric layer 111 disposed in the middle.

Referring to FIG. 5, the body 110 can be formed by alternately stacking ceramic green sheets on which the first internal electrode layer 121 is printed and ceramic green sheets on which the second internal electrode layer 122 is printed, and then sintering the same.

A material for forming the main portions 121a and 122a and lead portions 121b and 122b of the internal electrode layers 121 and 122 is not particularly limited, and a material with excellent electrical conductivity can be used. For example, a conductive paste for internal electrodes including one or more selected from the group consisting of nickel (Ni), copper (Cu), palladium (Pd), silver (Ag), gold (Au), platinum (Pt), tin (Sn), tungsten (W), titanium (Ti), and alloys thereof may be printed on a ceramic green sheet to form the main portions 121a and 122a and lead portions 121b and 122b.

A method for printing the conductive paste for internal electrodes may be a screen printing method, a gravure printing method, or the like, but the present disclosure is not limited thereto.

Meanwhile, in some embodiments of the present disclosure, in addition to the main portions 121a and 122a forming capacitance in the internal electrode layers 121 and 122 and the lead portions 121b and 122b securing connectivity with the external electrode, reinforcing patterns 121c and 122c including a carbide on both sides of the lead portion in a width direction is disposed, and a specific structure thereof will be described later.

The average thickness "te" of the internal electrode layers 121 and 122 is not particularly limited, and may vary depending on the purpose. In order to miniaturize the multilayer electronic component 100, the average thickness "te" of the internal electrode layers 121 and 122 may be 0.35 μm or less, and to improve the reliability of the multilayer electronic component 100 under high temperature and high pressure, the average thickness "te" of the internal electrode layers 121 and 122 may be 3 μm or more.

The average thickness "te" of the internal electrode layers 121 and 122 may be obtained as follows. In an image of a cross-section of the body 110 in length and thickness directions (L-T) taken at the center of the body 110 in the width direction scanned with a scanning electron microscope, a total of five internal electrode layers including two upper layers and two lower layers based on one internal electrode layer at a point at which a centerline of the body in the length direction and a centerline of the body in the thickness direction meet are extracted among the internal electrode layers, five points including two left points and two right points based on the one reference point are then determined at equal intervals based on the point at which the centerline of the body in the length direction and the centerline of the body in the thickness direction meet, and thereafter, thicknesses at the respective points may be measured and an average value thereof may be obtained.

The body 110 may include a capacitance formation portion Ac, which is a region in which the dielectric layer 111 and the internal electrode layers 121 and 122 overlap in a first direction. In particular, the capacitance formation portion Ac may refer to a region in which the main portions 121a and 122a of the internal electrode layers 121 and 122, to be described later, overlap in the first direction to form capacitance.

In addition, the capacitance formation portion Ac may be formed by repeatedly stacking the plurality of first and second internal electrode layers 121 and 122 with the dielectric layer 111 interposed therebetween.

Referring to FIGS. 2 and 3, cover portions 112 and 113 may be disposed on one surface and the other surface of the capacitance formation portion Ac in the first direction, respectively.

The cover portions 112 and 113 may serve to prevent damage to the internal electrodes due to physical or chemical stress, and may serve to improve the strength of the multilayer electronic component 100.

The cover portions 112 and 113 may not include an internal electrode layer, and include the same material as the dielectric layer 111, and may be formed by stacking a single dielectric layer or two or more dielectric layers on upper and lower surfaces of the capacitance formation portion Ac in the thickness direction, respectively. However, the components of the cover portion are not limited to the same components as the dielectric layer 111 of the capacitance formation portion Ac, and may include components different from those of the dielectric layer 111 of the capacitance formation portion Ac.

An average thickness "tc" of the cover portions 112 and 113 is not particularly limited. However, the average thickness "tc" of the cover portions 112 and 113 may be 15 μm or less in order to achieve miniaturization and high capacitance of the multilayer electronic component.

The average thickness "tc" of the cover portions 112 and 113 may refer to a size of the cover portions 112 and 113 in a first direction, and may be a value obtained by averaging sizes of the cover portions 112 and 113 measured at five points spaced apart at equal intervals in the first direction above or below the capacitance formation portion Ac.

Referring to FIG. 3, margin portions 114 and 115 may be disposed on one surface and the other surface of the capacitance formation portion Ac in a third direction, respectively.

The margin portions 114 and 115 may include a margin portion 114 disposed on one surface of the capacitance formation portion Ac in the third direction and a margin portion 115 disposed on the other surface of the capacitance formation portion Ac in the third direction. That is, the margin portions 114 and 115 may be disposed on both surfaces of the capacitance formation portion Ac in the width direction.

As shown in FIG. 3, the margin portions 114 and 115 may refer to a region between both ends of the main portions 121a and 122a and an interface of the body 110, in a cross-section of the body 110 in the width-thickness (W-T) direction.

The margin portions 114 and 115 may basically serve to prevent damages to the internal electrodes due to physical or chemical stress.

The margin portions 114 and 115 may be formed by applying a conductive paste to the ceramic green sheet, except where margin portions are to be formed to form an internal electrode.

In addition, in order to suppress a step by the internal electrode layers 121 and 122, after the internal electrodes are cut so as to be exposed to the fifth and sixth surfaces 5 and 6 of the body after lamination, the margin portions 114 and 115 may also be formed by stacking a single dielectric layer or two or more dielectric layers on both side surfaces of the capacitance formation portion Ac in the width direction.

Meanwhile, a width of the margin portions 114 and 115 is not particularly limited. However, in order to more easily implement miniaturization and high capacitance of the multilayer electronic component, an average width of the margin portions 114 and 115 may be 15 μm or less.

The average width of the margin portions 114 and 115 may refer to an average size of the margin portions 114 and 115 in a third direction, and may be a value obtained by averaging sizes of the margin portions 114 and 115 measured at five points spaced apart at equal intervals in the third direction in terms of the capacitance formation portion Ac.

Referring to FIGS. 1 and 2, external electrodes 131 and 132 are disposed on the body 110.

The external electrodes 131 and 132 are disposed on the body 110 and are connected to the internal electrode layers 121 and 122, respectively. Specifically, the external electrodes 131 and 132 may be connected to the lead portions 121b and 122b of the internal electrode layers 121 and 122, respectively.

As illustrated in FIG. 2, the external electrodes may be respectively disposed on the third and fourth surfaces 3 and 4 of the body 110, and include a first external electrode 131 connected to the first internal electrode layer 121 and a second external electrode 132 connected to the second internal electrode layer 122.

In the present embodiment, a structure in which the multilayer electronic component 100 has two external electrodes 131 and 132 is illustrated, but the number of the external electrodes 131 and 132 and the shape thereof may be varied depending on the internal electrode layers 121 and 122 or for other purposes.

Meanwhile, the external electrodes 131 and 132 may be formed of any material having electrical conductivity, such as metal, and a specific material may be determined in consideration of electrical properties, structural stability, and the like, and further, the external electrodes 131 and 132 may have a multilayer structure.

For example, the external electrodes 131 and 132 may include an electrode layer disposed on the body 110 and a plating layer disposed on the electrode layer.

For a more specific example of the electrode layer, the electrode layer may be a sintered electrode including a conductive metal and glass, or a resin-based electrode including a conductive metal and a resin.

In addition, the electrode layer may have a form in which a sintered electrode and a resin-based electrode are sequentially formed on the body 110. In addition, the electrode layer may be formed by transferring a sheet including a conductive metal onto a body 110 or by transferring a sheet including a conductive metal onto a sintered electrode.

A material having excellent electrical conductivity may be used as the conductive metal included in the electrode layer and the type of the electrode layers is not limited to any particular example. For example, the conductive metal may include one or more selected from the group consisting of nickel (Ni), copper (Cu), palladium (Pd), silver (Ag), gold (Au), platinum (Pt), tin (Sn), tungsten (W), titanium (Ti), and alloys thereof.

The plating layer may be a plating layer including one or more of selected from the group consisting of nickel (Ni), tin (Sn), palladium (Pd), and alloys thereof, and may be formed of a plurality of layers.

For a more specific example of the plating layers, the plating layer may be a Ni plating layer or a Sn plating layer, the plating layers may have a form in which the Ni plating layer and the Sn plating layer are sequentially formed, and a form in which the Sn plating layer, the Ni plating layer, and the Sn plating layer are sequentially formed. In addition, the plating layer may include a plurality of Ni plating layers and/or a plurality of Sn plating layers.

The size of the multilayer electronic component 100 needs not to be particularly limited.

In order to obtain miniaturization and high capacitance at the same time, the multilayer electronic component 100 may have a size of 0201 (length×width, 0.2 mm×0.1 mm) or less, and for a product in which reliability in high temperature and high pressure environments is important, the product may have a size of 3216 (length×width, 3.2 mm×1.6 mm) or more, but the present disclosure is not limited thereto.

Here, the length of the multilayer electronic component 100 may refer to a maximum size of the multilayer electronic component 100 in the second direction, and the width of the multilayer electronic component 100 may refer to a maximum size of the multilayer electronic component 100 in the third direction.

Referring to FIG. 6, the internal electrode layers 121 and 122 according to some embodiments of the present disclosure includes main portions 121a and 122a and lead portions 121b and 122b extending from the main portions to the third surface or the fourth surface to be connected to the external electrode and having a width in the third direction smaller than a width of the main portions in the third direction. Accordingly, the moisture resistance reliability of the multilayer electronic component 100 may be improved by reducing the width of the connection portions between the internal electrodes and the external electrodes, which is vulnerable to external moisture permeation.

Meanwhile, in a conventional case in which the internal electrode layers 121 and 122 are formed in a structure including main portions 121a and 122a and lead portions 121b and 122b, respectively, having a size in the third direction smaller than the main portions, in the conventional case, it may be advantageous to improve moisture resistance reliability, but since the corner region of the body 110 has a high proportion of a highly brittle ceramic material, a side effect of weakening the strength of the multilayer electronic component may occur.

In some embodiments of the present disclosure, the internal electrode layers 121 and 122 have a structure including main portions 121a and 122a and lead portions 121b and 122b, respectively, having a size in the third direction smaller than the main portions, and by disposing the reinforcing patterns 121c and 122c including carbides which is chemically stable, has high mechanical strength, and has excellent electrical properties, on both sides of the lead portions 121b and 122b in the width direction, the moisture resistance reliability and the strength of the multilayer electronic component 100 may be secured at the same time.

Specifically, the internal electrode layers 121 and 122 of the multilayer electronic component 100 according to some embodiments of the present disclosure include main portions 121a and 122a, respectively, lead portions 121b and 122b extending from the main portions to the third surface or the fourth surface to be connected to the external electrode and having a size in the third direction smaller than the main portions, respectively, and reinforcing patterns 121c and 122c disposed on both sides of the lead portions in the third direction, respectively, and the reinforcing pattern includes a carbide. Accordingly, the moisture resistance reliability of the multilayer electronic component 100 may be improved by forming the internal electrode layers 121 and 122 in a bottleneck pattern, and the strength of the multilayer electronic component 100 may be improved by reducing a proportion of a dielectric material in the corner region of the body 110.

A carbide may be referred to differently depending on the industrial field. However, in the present disclosure, a carbide is to a general term for a compound of carbon (C) and a metal element or carbon (C) and a non-metallic element.

It is preferable that the carbide included in the reinforcing patterns 121c and 122c is chemically stable, has high mechanical strength, and has excellent electrical properties so as to improve the strength of the multilayer electronic component 100. Specifically, the carbide according to some embodiments is an interstitial carbide, a covalent carbide, or a mixture thereof.

Specific examples of interstitial and covalent carbides may include one or more selected from the group consisting of tungsten carbide, titanium carbide, silicon carbide, zirconium carbide, hafnium carbide, vanadium carbide, niobium carbide, tantalum carbide, chromium carbide, molybdenum carbide, and the like, and the reinforcing patterns 121c and 122c according to some embodiments may include one or more selected from the group consisting of tungsten carbide, titanium carbide, silicon carbide, zirconium carbide, hafnium carbide, vanadium carbide, niobium carbide, tantalum carbide, chromium carbide, and molybdenum carbide.

Among the above-described interstitial carbides and covalent carbides, examples of carbides with excellent mechanical properties such as compressive strength, Young's modulus and elastic modulus, chemical resistance and electrical properties may include at least one selected from the group consisting of tungsten carbide (WC), titanium carbide. (TiC), and silicon carbide (SiC), and the like. That is, in some embodiments, the reinforcing patterns 121c and 122c may include one or more of tungsten carbide (WC), titanium carbide (TiC), and silicon carbide (SiC).

A method of forming the reinforcing patterns 121c and 122c including a carbide according to some embodiments of the present disclosure on both sides of the lead portions 121b and 122b in the third direction is not particularly limited. For example, the reinforcing patterns 121c and 122c may be formed by printing a conductive paste to form the main portion and the lead portion on a ceramic sheet for forming a dielectric layer, and printing a reinforcing pattern containing carbide powder on both sides of the lead portion in the width direction, and the main portion, the lead portion, and the reinforcing pattern may also be formed simultaneously.

Meanwhile, the reinforcing patterns 121c and 122c may include various conductive metal elements in addition to the carbide described above. Examples of conductive metal elements that may be included in the reinforcing patterns 121c and 122c include at least one selected from the group consisting of copper (Cu), nickel (Ni), silver (Ag), palladium (Pd), tin (Sn), and the like. One or more of a Cu—Ni alloy and an Ag—Ni alloy, which are alloys thereof, may be additionally included in the reinforcing patterns 121c and 122c.

In some embodiments, the reinforcing patterns 121c and 122c may be disposed to be spaced apart from the main portions 121a and 122a and the lead portions 121b and 122b, respectively. Accordingly, it is possible to effectively prevent moisture that has permeated into the body 110 from diffusing into the capacitance formation portion Ac.

In some embodiments, it the reinforcing patterns 121c and 122c are disposed to be spaced apart from the external electrodes 131 and 132, respectively. Accordingly, it is possible to effectively prevent external moisture from penetrating into the body 110.

In some embodiments, the reinforcing patterns 121c and 122c may be disposed to be simultaneously spaced apart from the main portions 121a and 122a, the lead portions 121b and 122b, and the external electrodes 131 and 132, respectively. Accordingly, not only can the permeation path of external moisture into the body 110 be reduced, but also it can effectively suppress the moisture permeating into the body 110 from diffusing into the main portions 121a and 122a constituting the capacitance formation portion Ac.

As an example of a method of measuring the type and content of elements included in the reinforcing patterns 121c and 122c, there may be a method of polishing the multilayer electronic component 100 in a second direction to expose a central portion of the lead portion 121b in the second direction and then performing a Scanning Electron Microscope—Energy Dispersive X-Ray Spectroscopy (SEM-EDS) on the reinforcing patterns 121c and 122c under 20 kV of acceleration voltage conditions. When the reinforcing patterns 121c and 122c include a carbide, a carbon (C) element and metal and non-metal elements constituting a carbide can be measured.

Referring to region P in FIG. 7, at least a portion of the carbide included in the reinforcing pattern 121c may be present in the form of particles 10 and 10'. In some embodiments, the particles 10 and 10' may be divided into first particles 10 and second particles 10', and the reinforcing pattern 121c may include at least one of the first particles or the second particles 10'.

The first particles 10 may refer to carbide particles 11, and the second particles 10' may refer to particles in which a carbide 13 is disposed on a surface of the conductive metal 12.

That is, the reinforcing pattern 121c may have a structure including first particles 10 comprised of carbide particles 11, may have a structure including second particles 10' in which the carbide 13 is disposed on at least a portion of the surface of the conductive metal 12, and may have a structure including both the first particles 10 and the second particles 10'.

Hereinafter, a shape and average size of the first particles 10 will be described based on the first particles 10, but the same can be applied to the second particle 10'.

Referring to FIG. 8, the shape of the first particles 10 can be determined from a relationship between a length (a) of a major axis and a length (b) of a minor axis of the particles. The length of the major axis is the length of the maximum Feret diameter of the particle, the length of the short axis may mean the length of the minimum Feret diameter of the particle. In this case, the Ferret diameter may mean the distance from one end edge to the other end edge of the particle. In the present disclosure, the shape of the particles is not particularly limited, but having a substantially spherical shape may be advantageous in blocking crack propagation, and short circuits between adjacent reinforcing patterns 121c and 122c can be prevented by reducing printing dispersion. Here, the fact that the particle has a substantially spherical shape may mean that b/a is 0.7 or more and 1.0 or less, 0.8 or more and 1.0 or less, or 0.9 or more and 1.0 or less.

Meanwhile, when the average size of the first particles 10 is substantially the same as the average thickness "te" of the internal electrode layers 121 and 122, a filling rate of the reinforcing pattern 121c may be insufficient and a short circuit may occur. In addition, when the average size of the first particles 10 is less than ⅕ of the average thickness "te" of the internal electrode layers 121 and 122, the average size of the first particles 10 may be excessive and the filling rate of the reinforcing pattern 121c may be low, and as a result thereof, an effect of improving the strength of the multilayer electronic component 100 may be minimal. Accordingly, in one embodiment, the strength of the multilayer electronic component 100 may be improved by adjusting the average size of the first particles 10 to ⅕ or less of the average thickness "te" of the internal electrode layers 121 and 122.

In some embodiments, the average size of the first particles 10 is 500 nm or less, so that the effect of improving the strength of the multilayer electronic component 100 may be more significant.

In some embodiments, the average size of the first particles 10 may mean a value obtained by adding the length of the major axis (a) and the length of the minor axis (b) of the first particles and dividing the same by 2. The average size of these first particles 10 may be further generalized by being measured in 10 or more first particles 10, and after polishing the multilayer electronic component 100 in the second direction to expose a central portion of the lead portion 121*b* in the second direction, the average size of the first particles 10 may be measured by an image obtained by observing a region in which the reinforcing patterns 121*c* and 122*c* are formed using a scanning electron microscope (SEM) under 20 kV acceleration voltage conditions.

Meanwhile, when the reinforcing patterns 121*c* and 122*c* include one or more of the first particles 10 and the second particles 10', an effect of preventing crack occurrence may vary depending on the filling rate of one or more of the first particles 10 and the second particles 10'.

Specifically, in the conventional case in which the reinforcing patterns 121*c* and 122*c* are not formed, a large number of cracks may occur due to brittleness of the ceramic material in a bottleneck of the internal electrode layers 121 and 122.

On the other hand, when an area fraction of the first particles 10 in the reinforcing patterns 121*c* and 122*c* is less than 30%, crack occurrence is alleviated, but this may not be enough to suppress crack occurrence itself. However, when the area fraction of the first particles 10 exceeds 70%, a proportion of the first particles 10 in the reinforcing patterns 121*c* and 122*c* is excessive, and there is a risk of fine cracks may occur between the first particles 10. Accordingly, in an embodiment, the area fraction of the first particles 10 in the reinforcing patterns 121*c* and 122*c* may be adjusted to be 30% or more and 70% or less, so that the crack occurrence in the bottleneck of the internal electrode layers 121 and 122 corresponding to a corner region of the body 110 may be effectively suppressed.

As an example of a method of measuring the area fraction of the first particles 10, there may be a method of measuring the area fraction of the first particles 10 as a ratio of an area of the region in which the first particles 10 are formed, compared to an area of a region (y) in which the first particles 10 are formed in the third direction and a region (x) thereof in the first direction. In this case, the first particles 10 can be identified by polishing the multilayer electronic component 100 in the second direction to expose the central portion of the lead portion 121*b* in the second direction and then a region in which the reinforcing patterns 121*c* and 122*c* are formed under 20 kV acceleration voltage conditions may be observed using a scanning electron microscope (SEM) and a relatively dark region may be determined to be a region in which the first particles 10 are formed.

Referring to region P' of FIG. 7, the reinforcing patterns 121*c* and 122*c* may have a continuous plate shape. In this case, the continuous plate shape may be a form obtained by sintering a carbide or conductive metal. In this case, it may be advantageous to remove the step if the average thickness of the plate-shaped reinforcing patterns 121*c* and 122*c* is the same as the average thickness of the internal electrode layers 121 and 122 including the lead portions 121*b* and 122*b*.

As set forth above, according to one of the many effects of the present disclosure, in the structure of the internal electrode layer having a main portion and a lead portion having a width smaller than the main portion, the moisture resistance reliability and strength of the multilayer electronic component may be secured at the same time by disposing reinforcing patterns including a carbide on both sides of the lead portion in the width direction.

However, the various and beneficial advantages and effects of the present disclosure are not limited to the above-described content, and may be more easily understood in the process of explaining specific embodiments of the present disclosure.

In the present specification, the expression 'an embodiment' used in the present disclosure does not mean the same embodiment, and is provided to emphasize and describe different unique characteristics. However, an embodiment presented above is not excluded from being implemented in combination with features of another embodiment. For example, even if a matter described in one specific embodiment is not described in another embodiment, it can be understood as a description related to another embodiment, unless there is a description contradicting or contradicting the matter in the other embodiment.

Terms used in this disclosure are only used to describe one embodiment, and are not intended to limit the disclosure. In this case, singular expressions include plural expressions unless the context clearly indicates otherwise.

While the example embodiments have been illustrated and described above, it will be configured as apparent to those skilled in the art that modifications and variations could be made without departing from the scope of the present disclosure as defined by the appended claims.

What is claimed is:

1. A multilayer electronic component, comprising:
a body including a dielectric layer and an internal electrode layer alternately disposed with the dielectric layer in a first direction, the body including a first surface and a second surface opposing each other in the first direction, a third surface and a fourth surface opposing each other in a second direction, perpendicular to the first direction, and a fifth surface and a sixth surface opposing each other in a third direction, perpendicular to the first and second directions; and
an external electrode disposed on the third and fourth surfaces,
wherein the internal electrode layer includes a main portion, a lead portion extending from the main portion to the third surface or the fourth surface to be connected to the external electrode and having a size smaller than a size of the main portion in the third direction, and a reinforcing pattern disposed on both sides of the lead portion in the third direction,
wherein the reinforcing pattern includes a carbide.

2. The multilayer electronic component of claim 1, wherein the reinforcing pattern comprises one or more selected from the group consisting of tungsten carbide, titanium carbide, silicon carbide, zirconium carbide, hafnium carbide, vanadium carbide, niobium carbide, tantalum carbide, chromium carbide, and molybdenum carbide.

3. The multilayer electronic component of claim 1, wherein the reinforcing pattern comprises first particles including the carbide.

4. The multilayer electronic component of claim 3, wherein an average size of the first particles is ⅕ or less of an average thickness of the internal electrode layer in the first direction.

5. The multilayer electronic component of claim 3, wherein an average size of the first particles is 500 nm or less.

6. The multilayer electronic component of claim 3, wherein an area fraction of the first particles is 30% or more and 70% or less with respect to 100% of an area of the reinforcing pattern.

7. The multilayer electronic component of claim 3, wherein when a length of a major axis of the first particle is a, and a length of a minor axis of the first particle is b, b/a is 0.9 or more and 1.0 or less.

8. The multilayer electronic component of claim 1, wherein the reinforcing pattern further comprises a conductive metal, and second particles in which the carbide is disposed on at least a portion of a surface of the conductive metal.

9. The multilayer electronic component of claim 1, wherein the reinforcing pattern has a form of a continuous plate.

10. The multilayer electronic component of claim 1, wherein the reinforcing pattern is disposed to be spaced apart from the main portion and the lead portion.

11. The multilayer electronic component of claim 1, wherein the reinforcing pattern is disposed to be spaced apart from the external electrode.

12. The multilayer electronic component of claim 1, wherein the reinforcing pattern further comprises one or more selected from the group consisting of copper (Cu), nickel (Ni), silver (Ag), palladium (Pd), and tin (Sn).

* * * * *